Figure 3:
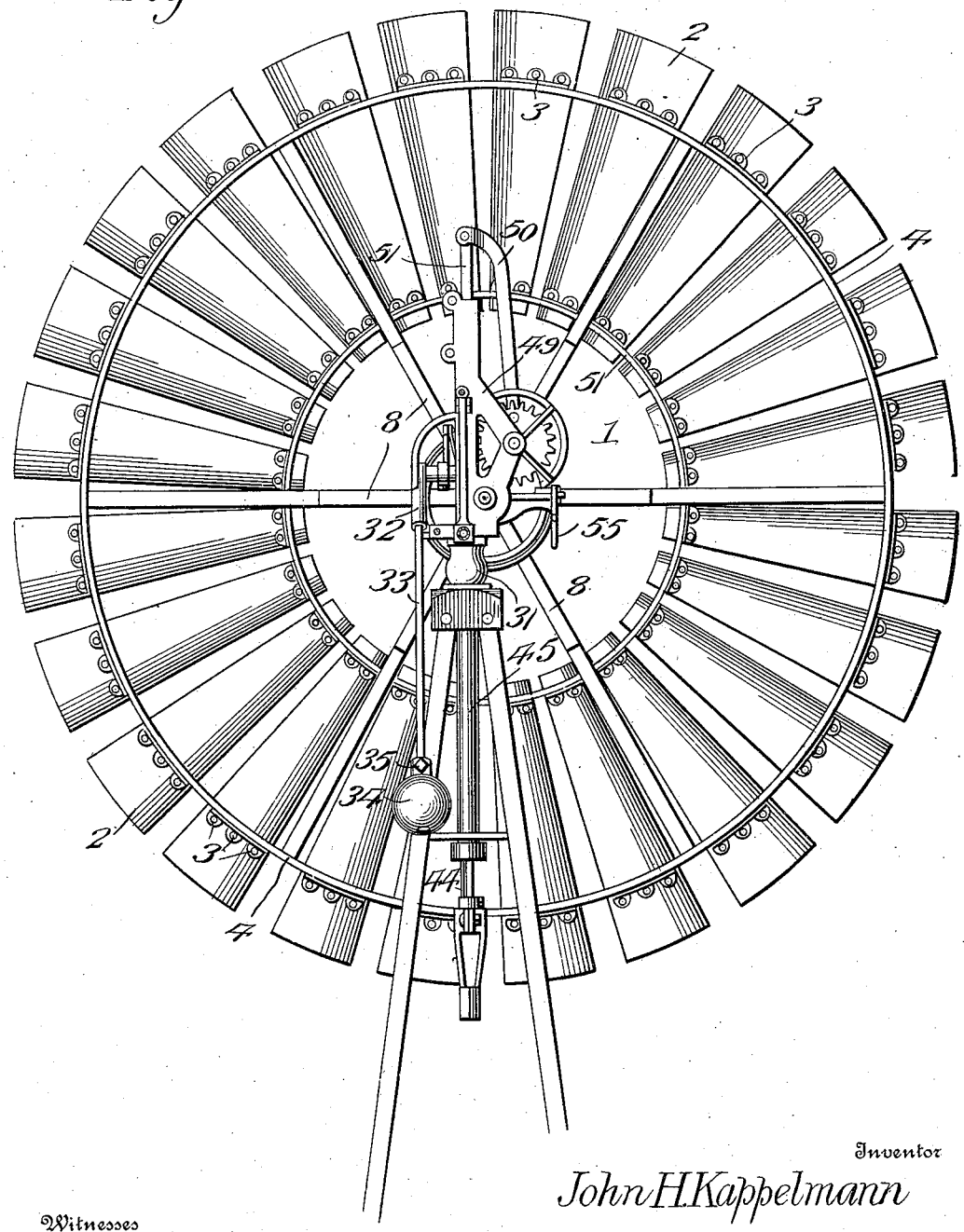

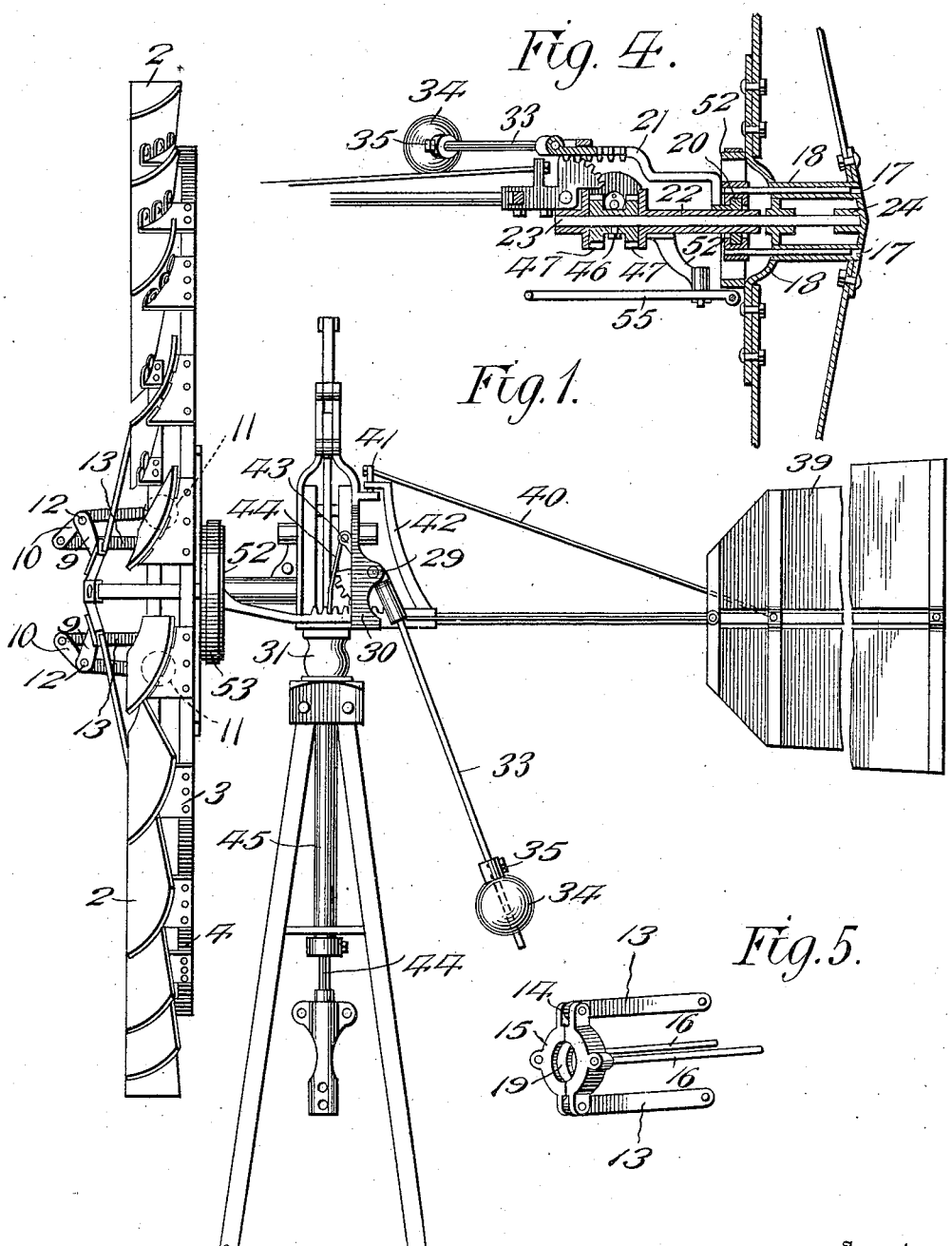

No. 877,434. PATENTED JAN. 21, 1908.
J. H. KAPPELMANN.
WINDMILL.
APPLICATION FILED OCT. 6, 1906.
3 SHEETS—SHEET 2.
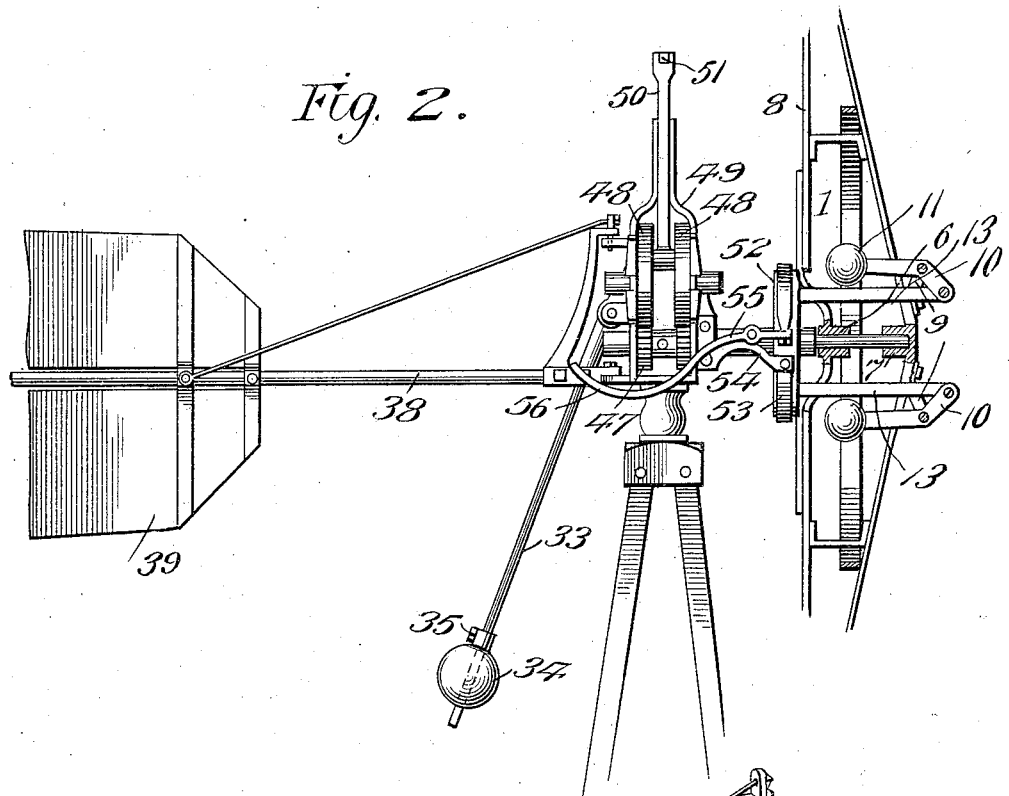
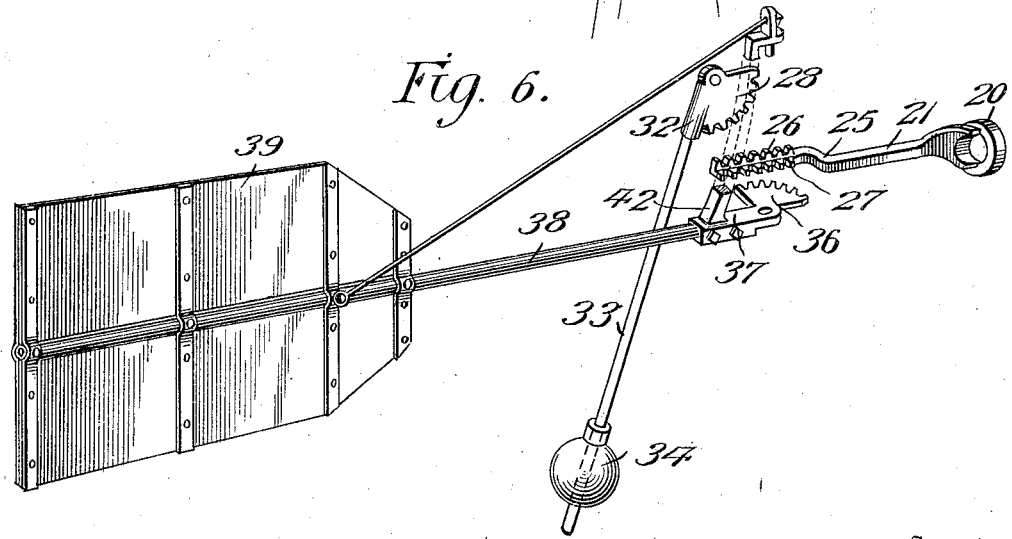

No. 877,434. PATENTED JAN. 21, 1908.
J. H. KAPPELMANN.
WINDMILL.
APPLICATION FILED OCT. 6, 1906.

3 SHEETS—SHEET 3.

Witnesses
Geo Ackman
C. P. Binnyea

Inventor
John H. Kappelmann
By Victor J. Evans
Attorney

UNITED STATES PATENT OFFICE.

JOHN H. KAPPELMANN, OF WASHINGTON, KANSAS.

WINDMILL.

No. 877,434.  Specification of Letters Patent.  Patented Jan. 21, 1908.

Application filed October 6, 1906. Serial No. 337,708.

*To all whom it may concern:*

Be it known that I, JOHN H. KAPPELMANN, a citizen of the United States of America, residing at Washington, in the county of Washington and State of Kansas, have invented new and useful Improvements in Windmills, of which the following is a specification.

This invention relates to windmills, and one of the principal objects of the same is to provide reliable and efficient means for regulating the speed of the mill.

Another object of the invention is to provide adjustable means whereby the speed of the mill may be regulated and thrown out of the wind whenever a certain maximum speed has been attained.

Another object of the invention is to provide automatically operating governor devices which will operate to efficiently retard the speed of the mill in case of a strong and constant wind and in which the parts of the mill will operate smoothly in case the wind should come in puffs or be irregular in its velocity.

Still another object of my invention is to provide a speed regulator and governor for wind mills and to provide a friction brake operatively connected to the governor or regulator to retard the rotation of the mill whenever it is presented to a strong wind and to stop the rotation by throwing the tail or vane of the mill out of the wind in case a certain predetermined speed has been attained.

The foregoing objects and advantages may be attained by means of the construction illustrated in the accompanying drawings, in which:—

Figure 1 is a side elevation of a windmill embodying my invention. Fig. 2 is a side elevation and partial section of a portion of the mill taken from the side opposite that shown in Fig. 1. Fig. 3 is a rear elevation of the mill. Fig. 4 is a detail longitudinal view. Fig. 5 is a detail perspective view of the sliding collar to which the governor levers are connected. Fig. 6 is a perspective view of the tail or vane and the means for shifting it out of the wind.

Referring to the drawings for a more particular description of my invention, the numeral 1 designates the wind wheel which may be of the usual or of any preferred construction. The wheel shown comprises a series of blades or vanes 2 secured by angular brackets 3 to the annular bands 4 and 5, said wheel being connected to the hub sections 6 and 7 by means of metal spokes or bars 8. It will be understood that my invention may be used in connection with windmills of other types.

Pivoted to brackets 9 secured to the outer surface of the wheel 1 are a pair of ball governor levers 10 provided with governor balls 11 at their terminal inner ends. The levers 10 are angular and are pivoted at the angle upon pins 12 to the brackets 9. The arms of the levers 10 are pivotally connected to connecting links 13, the opposite ends of said links being pivotally connected between lugs 14 projecting from the opposite sides of a sliding collar 15, said collar having forwardly projecting guide rods 16 secured thereto, said guide rods being mounted to slide in guideways 17 passing through the hub 18 of the wind wheel 1. Said collar 15 is interiorly grooved, as at 19, to engage a ring 20 formed upon the end of a rack bar 21, said collar being mounted to slide upon a sleeve 22 mounted upon a shaft 23 extending rearward from a socket 24 formed upon the hub of the wind wheel. The rack bar 21 is provided with an offset portion 25, and formed upon the end of said offset portion are two series of teeth or cogs 26, 27 which are disposed at right angles relatively, one series to the other, the series 26 engaging a sector 28 pivoted at 29 to a bracket 30 supported upon the vertical bearing 31 of the wind wheel frame, said sector having a tubular portion 32 in which is secured a rod 33 to which is adjustably secured a weighted ball 34 which is adapted to slide upon the rod 33 and held in adjusted position by means of a set screw 35. The series of teeth 27 engage a toothed sector 36 disposed at right angles to the sector 28 and connected by means of a tubular bearing 37 to a rod or bar 38, to the outer end of which the tail or vane 39 is secured. A brace rod 40 extends from the tail 39 to a bearing pin 41 pivotally mounted in the upper end of a bracket 42 extending upward from the tubular bearing 37. Extending upward from the sector 28 is an arm 43 having connected thereto a rod or wire 44 extending down through the pump tube 45 for operating a valve.

Secured to the rod or shaft 23 by means of a set screw 46 is a double pinion 47 which meshes with a double gear 48 journaled in a bracket 49 and provided with an intermediate wrist pin to which a pitman 50 is connected, the opposite end of said pitman being pivotally connected to the pump rod 51.

A frictional brake or retarder comprising a hub or ring 52 is secured to the hub portion of the wind wheel and surrounds the shaft 22, and a brake strap 53 encircles the ring 52, one end of said strap being secured to a bracket 54 and the opposite end having connected thereto a lever 55, said lever being pivoted to said bracket 54 and the outer end 56 of said lever being curved upwardly to be engaged by the rod 38 which supports the tail when said tail is swung out of the wind.

The operation of my invention may be briefly referred to as follows: When the wheel 1 is rotated rapidly by means of a strong wind the governor balls 11 are thrown outward, and the levers 13 push the collar 15 toward the tail of the mill and carry with them the rack bar 21, the teeth 26 of which engage the sector 28 to swing the weighted rod 33 and swing the tail 39 more or less out of the wind, depending upon the speed of the wind wheel. Since the weighted ball 34 is adjustable upon the rod 33 the mill may be adjusted to any required maximum speed. Should the wind come in puffs of varying velocity the ball 34 would move upward and downward and insure a smooth action of the speed regulating devices. When the tail 39 is swung out of the wind the curved lever 56 is raised by coming in contact with the rod 38 to tighten the strap 53 against the ring 52 to retard or stop the rotation of the wind wheel.

From the foregoing it will be obvious that a speed regulator and retarding device made in accordance with my invention will insure a smooth and constant action of the wheel and operating parts; that the device is of comparatively simple construction and that any maximum speed may be obtained by adjusting the weight 34 upon the rod 33 and that my speed regulating device may be applied to windmills of different types without requiring material alteration in the operative parts thereof.

Having thus described the invention, what is claimed as new, is:—

1. In a governing device for windmills, the combination of weighted governor members pivotally connected to the outer surface of a wind wheel, a pivoted tail or vane, means intermediate the governing members and the tail for swinging the latter out of the wind when a predetermined speed has been attained by the wheel, and a frictional brake comprising a ring, a brake strap encircling said ring, and an upwardly curved pivoted lever connected to said strap and operated by the movement of the vane.

2. In a device of the character described, a centrifugal governor, a sliding rack bar actuated by said governor, a pivoted tail, a shaft to which the tail is connected, a sector secured to said shaft and actuated by said rack bar, a pivoted lever, a sector thereon engaging said rack bar, an adjustable weight on said lever, a friction brake, and a curved lever connected thereto, said lever extending into the path of the tail shaft to be actuated by the movement of the tail.

3. In a speed regulating device for windmills, a centrifugal governor, a sliding rack bar connected thereto and actuated thereby, a pivoted tail, a shaft to which said tail is connected, a sector carried by said shaft, and engaging said rack bar, a friction brake comprising a ring carried by the wind wheel, a brake strap encircling said ring, a pivoted lever connected to one end of said strap, said lever having a curved free end engaged by the shaft of the tail to actuate said brake, substantially as described.

4. In a governing device for windmills, a governor, a pivoted tail, a shaft to which the tail is connected, means connected to the governor for moving said tail laterally, a friction brake comprising a ring and an encircling brake strap, and an upwardly curved lever connected to said strap and extending into the path of said tail shaft to be actuated by said tail for applying said brake.

5. In a regulating device for windmills, a governor, a tail, means actuated by said governor for controlling the movement of said tail, adjustable means whereby a determined speed of the wind wheel will actuate the tail shifting device, and a friction brake comprising a ring, a brake strap encircling said ring, and an upwardly curved pivoted lever having its end actuated by the movement of the tail.

In testimony whereof, I affix my signature in presence of two witnesses.

JOHN H. KAPPELMANN.

Witnesses:
J. C. MORROW,
A. W. BOND.